US009510006B2

(12) United States Patent
Lee (10) Patent No.: US 9,510,006 B2
(45) Date of Patent: Nov. 29, 2016

(54) SCALABLE VIDEO CODING PRIORITIZATION

(71) Applicant: Empire Technology Development LLC, Wilmington (DE)

(72) Inventor: Hyoung-Gon Lee, Gyeonggi-do (KR)

(73) Assignee: Empire Technology Development LLC, Wilmington, DE (US)

( * ) Notice: Subject to any disclaimer, the term of this patent is extended or adjusted under 35 U.S.C. 154(b) by 176 days.

(21) Appl. No.: 14/124,389

(22) PCT Filed: May 3, 2013

(86) PCT No.: PCT/US2013/039525
§ 371 (c)(1),
(2) Date: Dec. 6, 2013

(87) PCT Pub. No.: WO2014/178880
PCT Pub. Date: Nov. 6, 2014

(65) Prior Publication Data
US 2014/0328382 A1 Nov. 6, 2014

(51) Int. Cl.
*H04N 7/12* (2006.01)
*H04N 19/37* (2014.01)
*H04N 19/164* (2014.01)
*H04N 19/187* (2014.01)

(52) U.S. Cl.
CPC ............ *H04N 19/37* (2014.11); *H04N 19/164* (2014.11); *H04N 19/187* (2014.11)

(58) Field of Classification Search
CPC ... H04N 19/30; H04N 19/187; H04N 19/597
USPC .................................................. 375/240.01
See application file for complete search history.

(56) References Cited

U.S. PATENT DOCUMENTS

| 9,001,701 B1* | 4/2015 | Zhang ................. H04L 12/2464 370/260 |
| 2008/0152003 A1* | 6/2008 | Oguz ............. H04N 21/234327 375/240.12 |
| 2009/0082095 A1* | 3/2009 | Walker .................... G07F 17/32 463/25 |
| 2010/0158134 A1* | 6/2010 | Yin ........................ H04N 19/30 375/240.26 |
| 2010/0202453 A1 | 8/2010 | Martinez Bauza et al. |
| 2012/0014434 A1* | 1/2012 | Hong ..................... H04N 7/152 375/240.02 |
| 2012/0257675 A1 | 10/2012 | Wang et al. |
| 2013/0034170 A1* | 2/2013 | Chen ..................... H04N 13/00 375/240.25 |
| 2013/0070859 A1* | 3/2013 | Lu .......................... H04N 19/39 375/240.25 |

OTHER PUBLICATIONS

Schierl, T., et al., "Priority-based Transmission Scheduling for Delivery of Scalable Video Coding over Mobile Channels," Proceedings of the 5th International ICST Mobile Multimedia Communications Conference, pp. 5, ICST (2009).

(Continued)

*Primary Examiner* — Gims Philippe
*Assistant Examiner* — Ayman Abaza
(74) *Attorney, Agent, or Firm* — Brundidge & Stanger, P.C.

(57) ABSTRACT

Technologies are generally described for a scalable video coding scheme. In some examples, a scalable video encoder may include a device information receiver unit configured to receive device information regarding multiple devices requesting video content streaming; and a layer generation unit configured to generate a base layer and multiple scalability layers of video data for scalable coding of the video content based on, at least, the device information received by the device information receiver unit.

11 Claims, 6 Drawing Sheets

(56) References Cited

OTHER PUBLICATIONS

Schwarz, H., et al., "Overview of the Scalable Video Coding Extension of the H264/AVC Standard," IEEE Transactions on Circuits and Systems for Video Technology, vol. 17, No. 9, pp. 1103-1120 (2007).

Schwarz, H., and Wien, M., "Scalable Video Coding Extension of the H.264 AVC standards," IEEE Signal Processing Magazine, pp. 135-141, IEEE (2008).

International Search Report with Written Report for International Patent Application No. PCT/US2013/039525 mailed on Oct. 25, 2013, ISA/US, Commissioner for Patents, Virginia, USA.

* cited by examiner

SCALABLE VIDEO CODING PRIORITIZATION

CROSS-REFERENCE TO RELATED APPLICATIONS

This Application is the National Stage filing under 35 U.S.C. §371 of PCT Application Ser. No. PCT/US13/39525 filed on May 3, 2013. The disclosure of the PCT Application is hereby incorporated herein by reference in its entirety.

BACKGROUND

Advances in data compression technologies and expansion of networking infrastructures have led to a surge in digital video services such as, for example, video broadcast/multicast service, video streaming service, remote video storage service, video conferencing service, etc. In some situations, a common video stream is provided to multiple devices that support various processing and display capabilities. For example, when multiple gamers play a cloud-based game together, a game server may provide the same video stream to various gaming devices. As another example, when many viewers want to watch a real-time news program at the same time, a news server may provide the same video stream to various viewing devices.

Scalable video coding (SVC) aims to encode a high-quality video bitstream for efficient transmission. A scalable video encoder may divide a raw video bitstream into one or more subset video bitstreams. The scalable video encoder may derive the subset video bitstreams by dropping packets from the raw video bitstream to reduce bandwidth required for transmission. The subset video bitstream may represent a lower spatial resolution (smaller screen), lower temporal resolution (lower frame rate), and/or lower quality video signal compared with the raw video bitstream. When a user's device sends a request for streaming of a particular video to a server, the server may transmit at least one of the subset video bitstreams to the device. Then, the device may receive and combine the subset video bitstreams, to play the video.

SUMMARY

In an example, a method performed under control of a server may include receiving, from multiple devices that are connected to the server, a request for video content that includes a base layer and multiple scalability layers of video data; prioritizing the multiple scalability layers based on, at least, capabilities of each of the multiple devices; and transmitting, to each of the multiple devices, at least some of the multiple scalability layers based on, at least, the prioritization.

In another example, a method performed under control of a scalable video encoder for encoding video content may include receiving device information regarding multiple devices requesting streaming of the video content, and generating a base layer and multiple scalability layers of video data for scalable coding of the video content based on, at least, the device information.

In yet another example, a scalable video encoder may include a device information receiver unit configured to receive device information regarding multiple devices requesting video content streaming; and a layer generation unit configured to generate a base layer and multiple scalability layers of video data for scalable coding of the video content based on, at least, the device information received by the device information receiver unit.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a scalable video coding scheme. Further, technologies are herein generally described for prioritization among multiple scalability layers to implement a scalable video coding scheme.

In some examples, a server configured to implement a digital video service may broadcast or multicast video content to multiple devices, upon receiving a request for the video content from each of the devices. Each of the devices may transmit, to the server, information regarding its capabilities, when transmitting the request to the server and/or when subscribing to the digital video service. The information regarding the capabilities of the respective devices may be associated with at least one of spatial resolution (i.e., picture size), temporal resolution (i.e., frame rate) or quality (i.e., signal-to-noise ratio) supported by the respective devices.

In some examples, the server may determine and generate a base layer and multiple scalability layers of video data based on, at least, the capabilities of the respective devices. The server may include a scalable video encoder configured to determine and generate the base layer and the multiple scalability layers of video data. Then, the server may transmit, to each of the devices, the base layer and at least some of the multiple scalability layers, so that the respective devices may receive and combine the base layer and at least some of the multiple scalability layers to play the video content. The server may iterate the determining, generating and transmitting until streaming of the video content ends.

In some examples, the server may classify each of the devices into a respective one of multiple device groups based on, at least, the capabilities of the respective devices, and prioritize the multiple scalability layers based on, at least, a number of devices classified into each of the device groups. For instance, the server may determine a next scalability layer that is a subsequent upper level layer relative to a current scalability layer, taking into consideration the capabilities of the respective devices, to prioritize the multiple scalability layers. In such cases, the server may identify, from among the multiple scalability layers, one or more next available candidate scalability layers that are of the subsequent upper level layer relative to the current scalability layer; determine an increase of peak signal-to-noise ratio (PSNR) and an increase of bandwidth to scale-up from the current scalability layer to a respective one of the one or more next available candidate scalability layers; determine, for the respective one of the one or more next available candidate scalability layers, the number of devices classified into at least one of the device groups that supports the capabilities associated with the respective one of the one or more next available candidate scalability layers; and select, from among the one or more next available candidate scalability layers, the next scalability layer based on, at least, the increase of PSNR, the increase of bandwidth, and the number of devices classified into the at least one device group. The server may iterate the identifying of the one or more next available candidate scalability layers, the determining of the increase of PSNR and the increase of bandwidth, the determining of the number of devices classified into the at least one device group, and the selecting of the next scalability layer, until a predetermined spatial resolution, a predetermined temporal resolution and a predetermined quality are reached.

In some further examples, the server may determine a weight factor for each of the device groups. In such cases, the server may prioritize the multiple scalability layers based on, at least, the number of devices classified into each of the device groups and the weight factor for each of the device groups. By way of example, but not limitation, the server may determine the weight factor based on, at least, a sum of revenue associated with the devices in each of the device groups.

Figure 1:
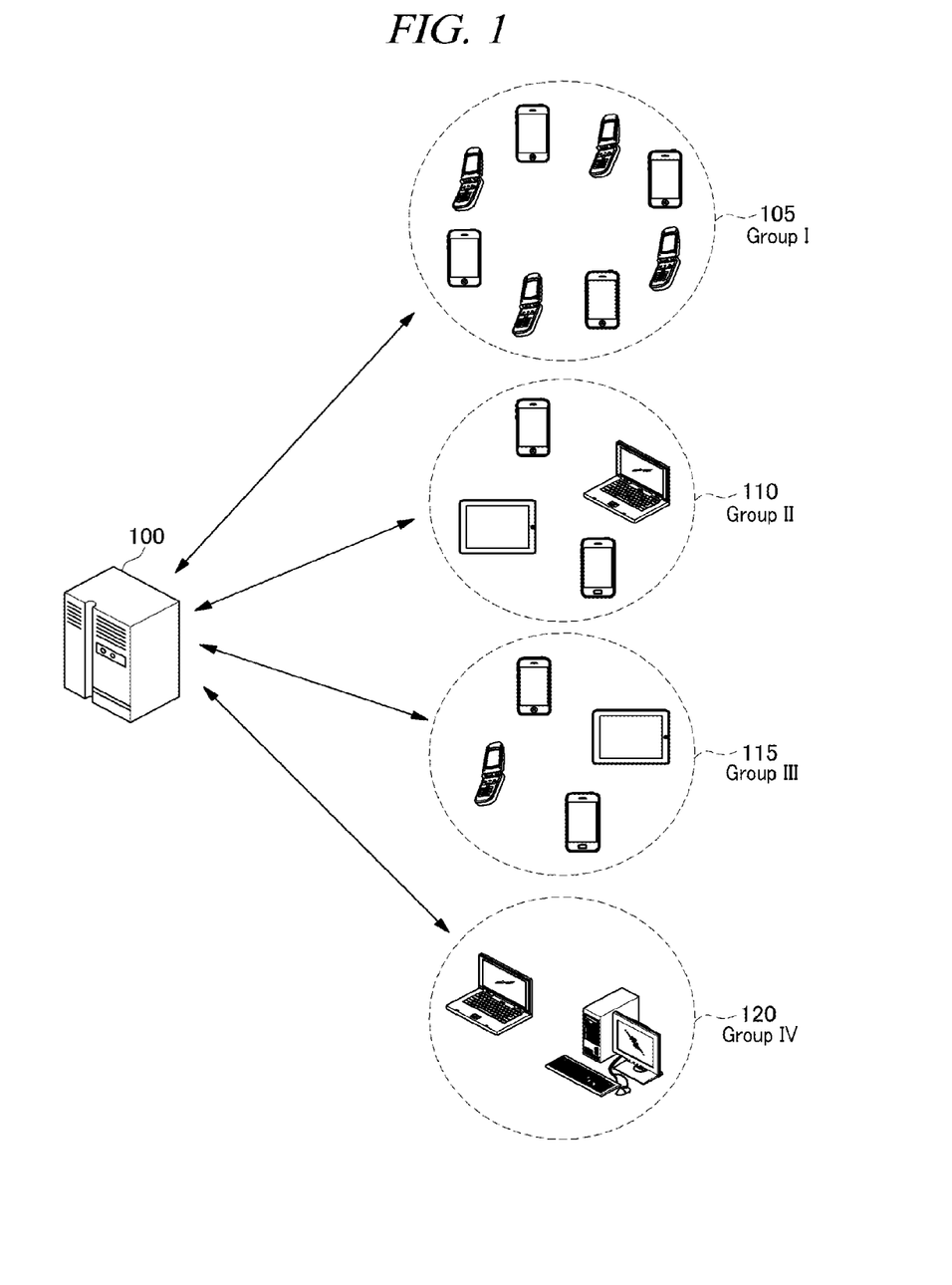
FIG. 1 schematically shows an illustrative example of an environment in which a server provides video content to multiple devices, arranged in accordance with at least some embodiments described herein.

FIG. 1 schematically shows an illustrative example of an environment in which a server provides video content to multiple devices, arranged in accordance with at least some embodiments described herein.

As depicted, a server 100 for providing a digital video service may be connected to and/or communicate with multiple devices over a network such as, for example, the Internet, a cellular network, a wide area network (WAN), a metropolitan area network (MAN), a local area network (LAN), a campus area network (CAN), a virtual private network (VPN), etc. The multiple devices may be of any type of electronic device configured to store, retrieve, compute, transmit and/or receive data, including, for example, a smartphone, a mobile phone, a personal digital assistant (PDA), a tablet, a laptop computer, a desktop computer, a television, a gaming console, etc. As described herein, devices have been divided into example Group I 105, Group II 110, Group III 115, and Group IV 120.

In some embodiments, server 100 may receive, from the multiple devices, requests for video content. Server 100 may also receive, from each of the devices, information regarding capabilities of each of the devices. By way of example, but not limitation, the information regarding the capabilities of respective devices may include at least one of information regarding spatial resolution (i.e., picture size), information regarding temporal resolution (i.e., frame rate) or information regarding quality (i.e., signal-to-noise ratio) supported by the respective devices. In some alternative embodiments, server 100 may receive, from each of the devices, any information identifying a model name of each of the devices, and infer the capabilities of respective devices based on product specifications thereof. Server 100 may receive the information regarding the capabilities of each of the respective devices when receiving the request for video content and/or before receiving the request for video content (e.g., when each of the devices subscribes to the digital video service associated with server 100).

In some embodiments, server 100 may classify each of the devices into a respective one of multiple device groups based on, at least, the information regarding the capabilities of the respective devices. By way of example, but not limitation, it may be assumed that one hundred (100) devices are connected to server 100 and request streaming of the video content. Based on the information regarding the capabilities of the respective devices, server 100 may identify that fifty (50) devices support spatial resolution of VGA (Video Graphics Array) and temporal resolution of 30 fps (frames per second), twenty (20) devices support spatial resolution of HD (High Definition) and temporal resolution of 30 fps, twenty (20) devices support spatial resolution of VGA and temporal resolution of 60 fps, and ten (10) devices support spatial resolution of UHD (Ultra High Definition) and temporal resolution of 60 fps. In such cases, server 100 may categorize the one hundred devices into four (4) device groups as in Table 1 below.

TABLE 1

| Device Group | Spatial Resolution | Temporal Resolution | No. of Devices |
| --- | --- | --- | --- |
| Group I | VGA | 30 fps | 50 |
| Group II | HD | 30 fps | 20 |

TABLE 1-continued

| Device Group | Spatial Resolution | Temporal Resolution | No. of Devices |
|---|---|---|---|
| Group III | VGA | 60 fps | 20 |
| Group IV | UHD | 60 fps | 10 |

In some embodiments, server 100 may first generate a base layer, and then generate multiple scalability layers for scalable coding of the video content, with prioritizing the multiple scalability layers. For example, server 100 may determine and generate the multiple scalability layers step by step. That is, server 100 may determine a next scalability layer that is a subsequent upper level layer relative to a current scalability layer by taking into consideration the capabilities of the respective devices. In such cases, server 100 may identify, from among the multiple scalability layers, one or more next available candidate scalability layers that are of the subsequent upper level layer relative to the current scalability layer. Then, server 100 may determine an increase of peak signal-to-noise ratio (PSNR) and an increase of bandwidth to scale-up from the current scalability layer to a respective one of the one or more next available candidate scalability layers, and determine, for the respective one of the one or more next available candidate scalability layers, a number of devices classified into at least one of the device groups that supports the capabilities associated with the respective one of the one or more next available candidate scalability layers. Server 100 may then select, from among the one or more next available candidate scalability layers, the next scalability layer based on, at least, the increase of PSNR, the increase of bandwidth, and the number of devices classified into the at least one device group. For instance, server 100 may calculate performance enhancement $L_{cand}(i)$ to be achieved by scaling-up from the current scalability layer to the respective one of the one or more next available candidate scalability layers, as in Formula 1 below.

$$L_{cand}(i) = \frac{\sum_j \alpha_{cand}(i, j) * (PSNR_{cand}(i) - PSNR(i-1))}{R_{cand}(i) - R(i-1)} \quad \text{(Formula 1)}$$

In Formula 1, i denotes a level of the next scalability layer, (i−1) denotes a level of the current scalability layer, j is an indication of the device groups, ($R_{cand}(i)-R(i-1)$) denotes an increase of bandwidth to scale-up from the current scalability layer to the respective one of the one or more next available candidate scalability layers, ($PSNR_{cand}(i)-PSNR(i-1)$) denotes an increase of PSNR to scale-up from the current scalability layer to the respective one of the one or more next available candidate scalability layers, and $\alpha_{cand}(i, j)$ denotes a portion of devices classified into the j-th device group for which the i-th scalability layer is applicable (i.e., the number of devices classified into the j-th device group for which the i-th scalability layer is applicable per a total number of devices that request streaming of the video content).

In some further embodiments, server 100 may determine the next scalability layer further based on a weight factor for each of the device groups. In such cases, server 100 may calculate performance enhancement $L_{cand}(i)$ to be achieved by scaling-up from the current scalability layer to the respective one of the one or more next available candidate scalability layers, as in Formula 2 below.

$$L_{cand}(i) = \frac{\sum_j \alpha_{cand}(i, j) \cdot \beta(j) * (PSNR_{cand}(i) - PSNR(i-1))}{R_{cand}(i) - R(i-1)} \quad \text{(Formula 2)}$$

In Formula 2, β(j) denotes a weight factor for the j-th device group. By way of example, but not limitation, server 100 may determine the weight factor for each of the device groups based on, at least, a sum of revenue (e.g., subscription fee, etc.) associated with the devices in each of the device groups.

Then, in some embodiments, server 100 may determine the next scalability layer L(i) as in Formula 3 below.

$$L(i) = \underset{cand}{\mathrm{argmax}}\{L_{cand}(i)\} \quad \text{(Formula 3)}$$

Figure 2A:
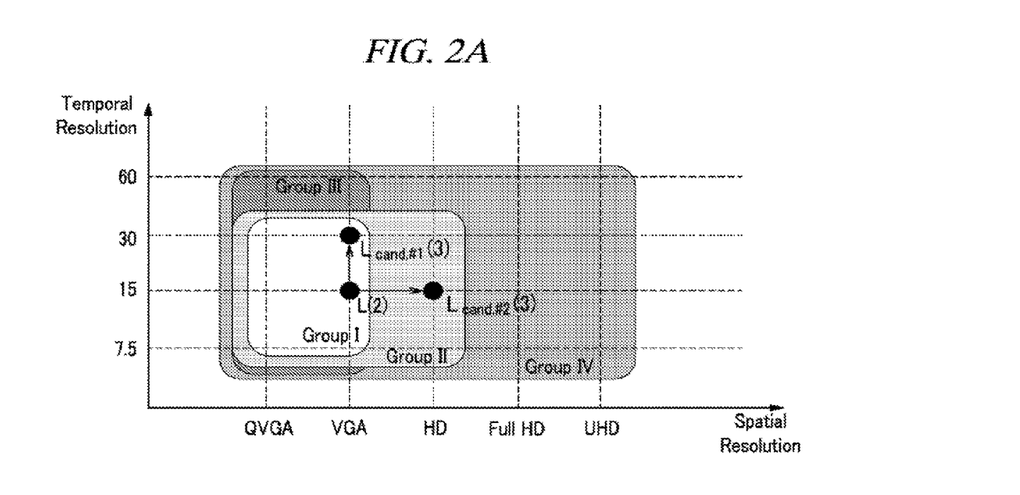
FIGS. 2A-2B schematically show prioritization among scalability layers for implementing a scalable video coding scheme, arranged in accordance with at least some embodiments described herein.
Figure 2B:
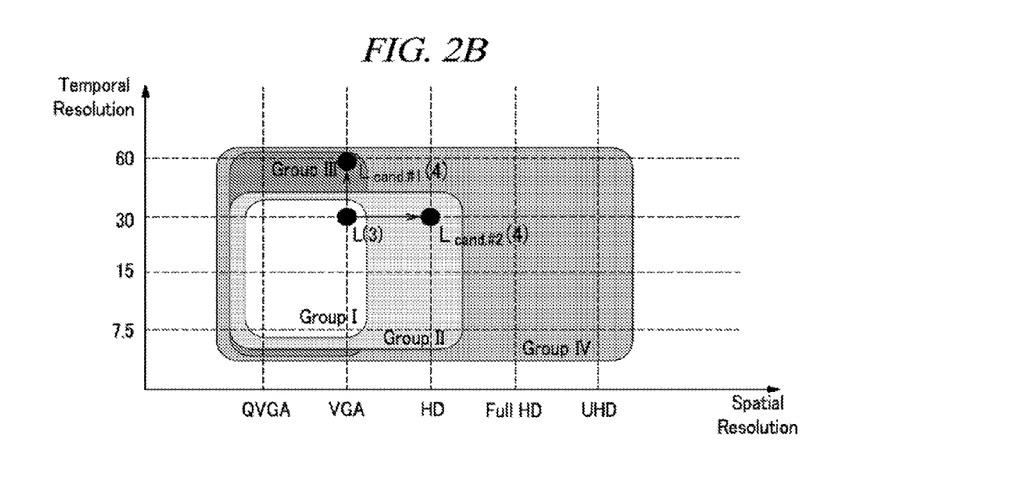

FIGS. 2A-2B schematically show prioritization among scalability layers for implementing a scalable video coding scheme, arranged in accordance with at least some embodiments described herein. The example embodiments associated with FIGS. 2A-2B will be described with reference to FIG. 1.

In the example embodiments illustrated in FIGS. 2A-2B, it may be assumed that the one hundred devices categorized in Table 1 above are connected to server 100. Also, it may be assumed that server 100 takes into consideration spatial resolution and temporal resolution (i.e., does not take into consideration quality) when prioritizing the scalability layers. Although FIGS. 2A-2B illustrate the prioritization process in 2-dimensional diagrams without taking into consideration quality, those skilled in the art will readily appreciate that the diagrams in FIGS. 2A-2B may be expanded in 3-dimension when taking into consideration the quality.

In the example embodiment illustrated in FIG. 2A, a second scalability layer L(2), which supports spatial resolution of VGA (Video Graphics Array) and temporal resolution of 15 fps, is the current scalability layer. Server 100 may determine a third scalability layer L(3) based on, at least, capabilities of the respective devices. There may be two next available candidate scalability layers, i.e., a first candidate for the third scalability layer and a second candidate for the third scalability layer. The first candidate for the third scalability layer may support the spatial resolution of VGA and the temporal resolution of 30 fps, while the second candidate for the third scalability layer may support the spatial resolution of HD (High Definition) and the temporal resolution of 15 fps. In this example, it may be assumed that the increase of the PSNR is 4 dB and the increase of the required bandwidth is 200 kbps when scaling-up from the second scalability layer to the first candidate for the third scalability layer (i.e., enhancing the temporal resolution from 15 fps to 30 fps), while the increase of the PSNR is 5 dB and the increase of the required bandwidth is 220 kbps when scaling-up from the second scalability layer to the second candidate for the third scalability layer (i.e., enhancing the spatial resolution from VGA to HD). The above values associated with the increase of the PSNR and the increase of the required bandwidth may be just example values that may vary depending on various network conditions.

Then, server 100 may calculate the performance enhancement for the first candidate $L_{cand.\#1}(3)$ and the performance enhancement for the second candidate $L_{cand.\#2}(3)$, in accordance with Formula 1 above. In the example embodiment shown in Table 1, since the spatial resolution of VGA and the temporal resolution of 30 fps are applicable to the devices in Groups I, II, III and IV, server 100 may calculate $L_{cand.\#1}(3)$ as $\{(50+20+20+10)/100\}*4$ dB/200 kbps=0.02; while, since the spatial resolution of HD and the temporal resolution of 15 fps are applicable to the devices in Groups II and IV, server 100 may calculate $L_{cand.\#2}(3)$ as $\{(20+10)/100\}*5$ dB/220 kbps=0.0068. Since the performance enhancement for the first candidate ($L_{cand.\#1}(3)$) is greater than the performance enhancement for the second candidate ($L_{cand.\#2}(3)$), server 100 may determine the first candidate to be the third scalability layer L(3).

In the example embodiment illustrated in FIG. 2B, the third scalability L(3), which supports the spatial resolution of VGA and the temporal resolution of 30 fps, is the current scalability layer. Server 100 may determine a fourth scalability layer L(4) based on, at least, capabilities of the respective devices. There may be two next available candidate scalability layers, i.e., a first candidate for the fourth scalability layer and a second candidate for the fourth scalability layer. The first candidate for the fourth scalability layer may support the spatial resolution of VGA and the temporal resolution of 60 fps, while the second candidate for the fourth scalability layer may support the spatial resolution of HD and the temporal resolution of 30 fps. In this example, it may be assumed that the increase of the PSNR is 4 dB and the increase of the required bandwidth is 250 kbps when scaling-up from the third scalability layer to the first candidate for the fourth scalability layer (i.e., enhancing the temporal resolution from 30 fps to 60 fps), and also when scaling-up from the third scalability layer to the second candidate for the fourth scalability layer (i.e., enhancing the spatial resolution from VGA to HD). The above values associated with the increase of the PSNR and the increase of the required bandwidth may be just example values that may vary depending on various network conditions.

Then, server 100 may calculate the performance enhancement for the first candidate $L_{cand.\#1}(4)$ and the performance enhancement for the second candidate $L_{cand.\#2}(4)$, in accordance with Formula 1 above. In the example embodiment shown in Table 1, since the spatial resolution of VGA and the temporal resolution of 60 fps are applicable to the devices in Groups III and IV, server 100 may calculate $L_{cand.\#1}(4)$ as $\{(20+10)/100\}*5$ dB/250 kbps=0.006; while, since the spatial resolution of HD and the temporal resolution of 30 fps are applicable to the devices in Groups II and IV, server 100 may calculate $L_{cand.\#2}(4)$ as $\{(20+10)/100\}*5$ dB/250 kbps=0.006. Since the performance enhancement for the first candidate ($L_{cand.\#1}(4)$) is equal to the performance enhancement for the second candidate ($L_{cand.\#2}(4)$), server 100 may randomly select from among the first candidate and the second candidate in some cases.

In some other cases, server 100 may take into consideration weight factors for Groups I-IV, as in Formula 2 above. In such cases, assuming that the weight factors for Groups I-IV, β(1), β(2), β(3) and β(4) are 1.0, 0.8, 0.9 and 0.8, respectively, server 100 may calculate $L_{cand.\#1}(4)$ as $\{(0.9*20+0.8*10)/100\}*5$ dB/250 kbps=0.0052, and calculate $L_{cand.\#2}(4)$ as $\{(0.8*20+0.8*10)/100\}*5$ dB/250 kbps=0.0048. Since the performance enhancement for the first candidate ($L_{cand.\#1}(4)$) is greater than the performance enhancement for the second candidate ($L_{cand.\#2}(4)$), server 100 may determine the first candidate as the fourth scalability layer L(4).

In some embodiments, server 100 may iterate such a process of prioritization until a predetermined spatial resolution, a predetermined temporal resolution and a predetermined quality are reached. Then, in some embodiments, server 100 may transmit, to each of the devices, the base layer and at least some of the scalability layers based on, at least, the prioritization. Server 100 may iterate the prioritization of the scalability layers, and the generation and transmission of the base layer and the scalability layer, until streaming of the video content ends.

As such, server 100 may dynamically generate and/or encode the multiple scalability layers based on the capabilities of the devices that request streaming of the video content, thereby enhancing overall network efficiency as well as improving user experience.

Although the example embodiments described with regard to FIGS. 1-2 illustrate that the devices are categorized into four device groups, those skilled in the art will appreciate that server 100 may categorize the devices into any number of device groups depending on the desired implementation.

Figure 3:
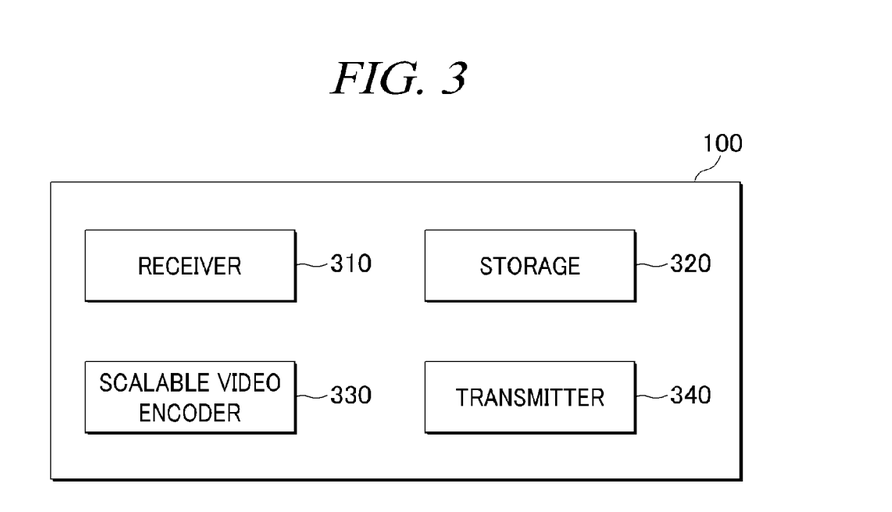
FIG. 3 shows a schematic block diagram illustrating an example architecture of a server for implementing a scalable video coding scheme, arranged in accordance with at least some embodiments described herein.

FIG. 3 shows a schematic block diagram illustrating an example architecture of server 100 for implementing a scalable video coding scheme, arranged in accordance with at least some embodiments described herein. The example embodiments associated with FIG. 3 will be described with reference to FIGS. 1-2.

As depicted, server 100 may include a receiver 310, a storage 320, a scalable video encoder 330, and a transmitter 340. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Receiver 310 may be configured to receive a request for video content from multiple devices. The multiple devices may be of any type of electronic device configured to store, retrieve, compute, transmit and/or receive data, including, for example, a smartphone, a mobile phone, a personal digital assistant (PDA), a tablet, a laptop computer, a desktop computer, a television, a gaming console, etc. Receiver 310 may also be configured to receive, from the respective devices, information regarding capabilities of the respective devices requesting the video content. By way of example, but not limitation, the information regarding the capabilities of the respective devices may include at least one of information regarding spatial resolution (i.e., picture size), information regarding temporal resolution (i.e., frame rate) or information regarding quality (i.e., signal-to-noise ratio) supported by the respective devices. In some alternative embodiments, receiver 310 may be configured to receive, from the respective devices, any information identifying model names of the respective devices, etc., so that server 100 may infer the capabilities of the respective devices.

Storage 320 may be configured to store the video content received by receiver 310. Depending on the desired implementation, storage 320 may be a magnetic disk device such as a flexible disk drive and a hard disk drive (HDD), an optical disk drive such as a compact disk (CD) drive or a digital versatile disk (DVD) drive, a solid state drive (SSD), a tape drive, and so on.

Scalable video encoder 330 may be configured to classify each of the devices into a respective one of multiple device groups based at least in part on the capabilities of the respective devices included in and/or inferred from the information received by receiver 310, prioritize multiple scalability layers based at least in part on a number of devices classified into each of the device groups, and generate a base layer and the scalability layers associated with the video content stored in storage 320. Functions and/or operations of scalable video encoder 330 will be described in more detail with reference to FIG. 4.

Transmitter 340 may be configured to transmit, to all of the devices, the base layer and at least some of the scalability layers generated by scalable video encoder 330.

Figure 4:
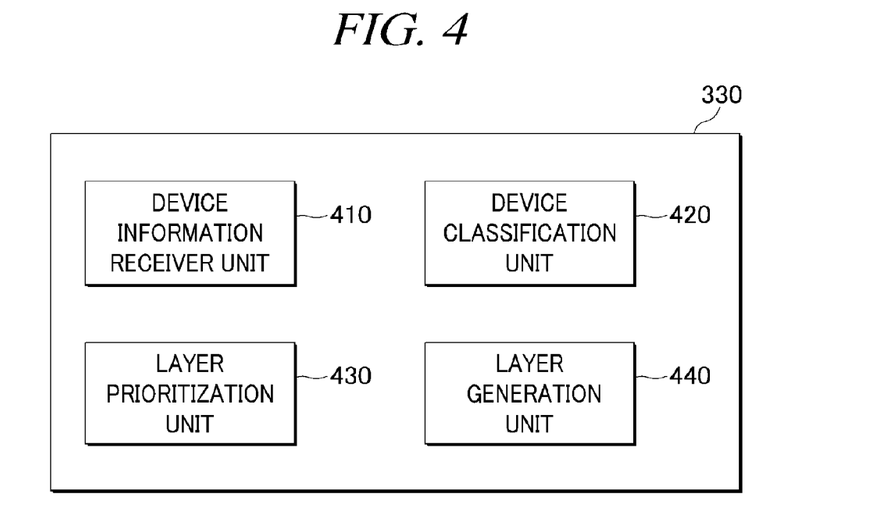
FIG. 4 shows a schematic block diagram illustrating an example architecture of a scalable video encoder for implementing a scalable video coding scheme, arranged in accordance with at least some embodiments described herein.

FIG. 4 shows a schematic block diagram illustrating an example architecture of scalable video encoder 330 for implementing a scalable video coding scheme, arranged in accordance with at least some embodiments described herein. The example embodiments associated with FIG. 4 will be described with reference to FIGS. 1-3.

Scalable video encoder 330 may be a component of server 100, or may be hosted or controlled by server 100, or one or more segments of a server farm or a server cluster for providing video content. As depicted, scalable video encoder 330 may include a device information receiver unit 410, a device classification unit 420, a layer prioritization unit 430 and a layer generation unit 440. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Device information receiver unit 410 may be configured to receive device information regarding multiple devices requesting video content streaming, e.g., from receiver 310 (in FIG. 3). By way of example, but not limitation, the device information may include capabilities of the respective devices, such as spatial resolution, temporal resolution or quality supported by the respective devices.

Device classification unit 420 may be configured to classify each of the devices into a respective one of multiple device groups based on, at least, the device information received by device information receiver unit 410. By way of example, but not limitation, device classification unit 420 may categorize the devices as in Table 1 above.

Layer prioritization unit 430 may be configured to prioritize multiple scalability layers of video data for scalable coding of the video content based on, at least, an increase of peak signal-to-noise ratio (PSNR), an increase of bandwidth, and a number of devices classified into each of the device groups, as described with regard to Formulas 1 and 3. In some embodiments, layer prioritization unit 430 may be configured to identify, from among the multiple scalability layers, one or more next available candidate scalability layers that are of a subsequent upper level layer relative to a current scalability layer; determine the increase of PSNR and the increase of bandwidth to scale-up from the current scalability layer to a respective one of the next available candidate scalability layers; determine, for the respective one of the next available candidate scalability layers, the number of devices classified into at least one of the device groups that supports the capabilities associated with the respective one of the next available candidate scalability layers; and select, from among the next available candidate scalability layers, a next scalability layer based on, at least, the increase of PSNR, the increase of bandwidth, and the number of devices classified into the at least one device group, as described with regard to Formulas 1 and 3.

In some other embodiments, layer prioritization unit 430 may be configured to prioritize the multiple scalability layers based on, at least, the number of devices classified into each of the device groups and a weight factor for each of the device groups, as described with regard to Formulas 2 and 3. By way of example, but not limitation, layer prioritization unit 430 may calculate a sum of revenue associated with devices in each of the device groups, and determine the weight factor based on results of such calculation.

In some further embodiments, layer prioritization unit 430 may be configured to iterate the identifying of the next available candidate scalability layers, the determining of the increase of PSNR and the increase of bandwidth, the determining of the number of devices classified into the at least one device group, and the selecting of the next scalability layer, until a predetermined spatial resolution, a predetermined temporal resolution and a predetermined quality are reached.

Layer generation unit 440 may be configured to generate a base layer and the multiple scalability layers based on, at least, the prioritization by layer prioritization unit 430.

Figure 5:
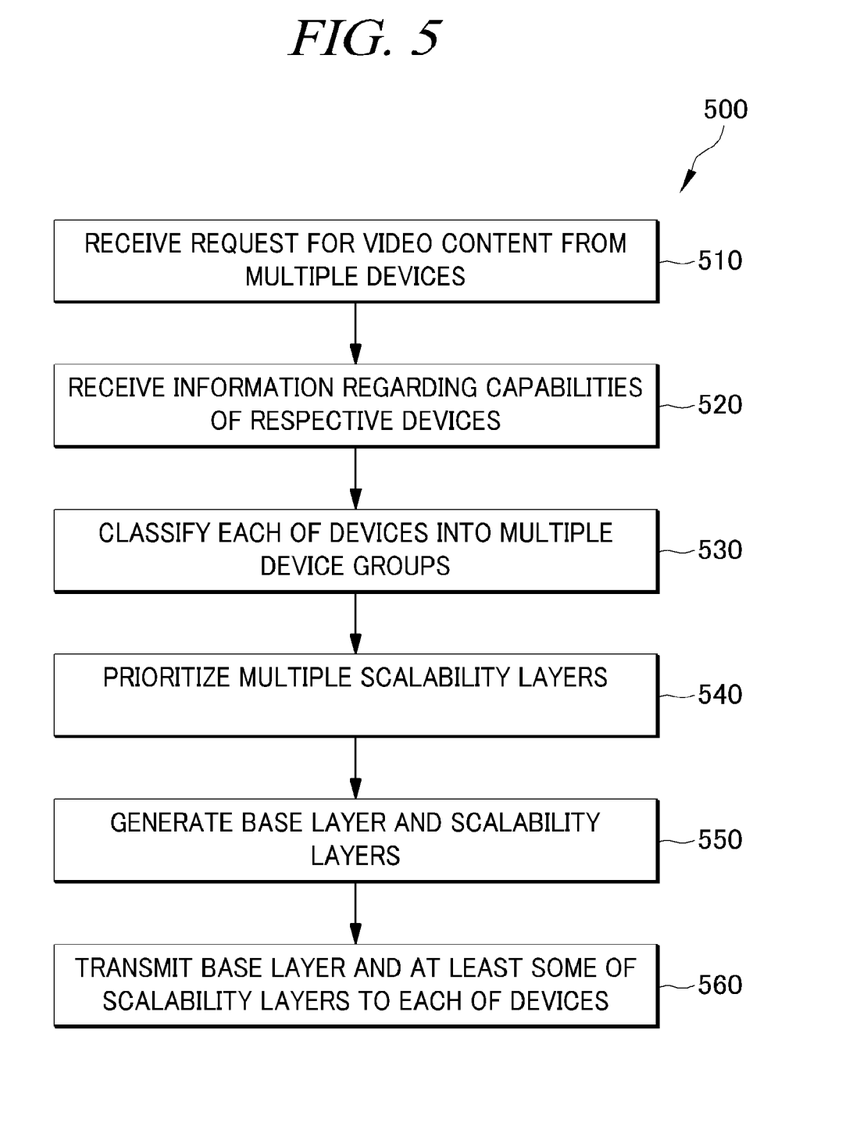
FIG. 5 shows an example flow diagram of a process for a server implementing a scalable video coding scheme, arranged in accordance with at least some embodiments described herein.

FIG. 5 shows an example flow diagram of a process 500 for a server implementing a scalable video coding scheme, arranged in accordance with at least some embodiments described herein. The example embodiments associated with FIG. 5 will be described with reference to FIGS. 1-4.

Process 500 may be implemented in a server such as server 100 including receiver 310, storage 320, scalable video encoder 330, and transmitter 340. Process 500 may include one or more operations, actions, or functions as illustrated by one or more blocks 510, 520, 530, 540, 550 and/or 560. Although illustrated as discrete blocks, various blocks may be divided into additional blocks, combined into fewer blocks, or eliminated, depending on the desired implementation. Processing may begin at block 510.

At block 510 (Receive Request for Video Content from Multiple Devices), server 100 (e.g., receiver 310) may receive a request for video content from multiple devices. The multiple devices may be of any type of electronic device configured to store, retrieve, compute, transmit and/or receive data, including, for example, a smartphone, a mobile phone, a personal digital assistant (PDA), a tablet, a laptop computer, a desktop computer, a television, a gaming console, etc. Processing may continue from block 510 to block 520.

At block 520 (Receive Information regarding Capabilities of Respective Devices), server 100 (e.g., receiver 310) may receive, from the respective devices, information regarding capabilities of the respective devices. By way of example, but not limitation, the capabilities of a respective one of the devices may be associated with at least one of spatial resolution, temporal resolution or quality supported by the respective one of the devices. Processing may continue from block 520 to block 530.

At block 530 (Classify Each of Devices into Multiple Device Groups), server 100 (e.g., scalable video encoder 330 or device classification unit 420 of scalable video encoder 330) may classify each of the devices into a respective one of multiple device groups based on, at least, the capabilities of the respective devices. Processing may continue from block 530 to block 540.

At block 540 (Prioritize Multiple Scalability Layers), server 100 (e.g., scalable video encoder 330 or layer prioritization unit 430 of scalable video encoder 330) may prioritize multiple scalability layers based on, at least, the capabilities of the respective devices. In some embodiments, server 100 may prioritize multiple scalability layers based on, at least, an increase of peak signal-to-noise ratio (PSNR), an increase of bandwidth, and a number of devices classified into each of the device groups, as described with regard to Formulas 1 and 3. For instance, server 100 may identify, from among the multiple scalability layers, one or more next available candidate scalability layers that are of a subsequent upper level layer relative to a current scalability layer; determine the increase of PSNR and the increase of bandwidth to scale-up from the current scalability layer to a respective one of the next available candidate scalability layers; determine, for the respective one of the next available candidate scalability layers, the number of devices classified into at least one of the device groups that supports the capabilities associated with the respective one of the next available candidate scalability layers; and select, from among the next available candidate scalability layers, a next scalability layer based on, at least, the increase of PSNR, the increase of bandwidth, and the number of devices classified into the at least one device group. Server 100 may then iterate the identifying of the next available candidate scalability layers, the determining of the increase of PSNR and the increase of bandwidth, the determining of the number of devices classified into the at least one device group, and the selecting of the next scalability layer, until a predetermined spatial resolution, a predetermined temporal resolution and a predetermined quality are reached. In some embodiments, server 100 may determine a weight factor for each of the device groups, and prioritize the multiple scalability layers based on, at least, the number of devices classified into each of the device groups and the weight factor for each of the device groups. Processing may continue from block 540 to block 550.

At block 550 (Generate Base Layer and Scalability Layers), server 100 (e.g., scalable video encoder 330 or layer generation unit 440 of scalable video encoder 330) may generate a base layer and the multiple scalability layers based on, at least, the prioritization. Processing may continue from block 550 to block 560.

At block 560 (Transmit Base Layer and at least some of Scalability Layers to Each of Devices), server 100 (e.g., transmitter 340) may transmit, to each of the devices, the base layer and at least some of the scalability layers. Processing may continue from block 560 to block 510, and iterate blocks 510 to 560 until streaming of the video content ends.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
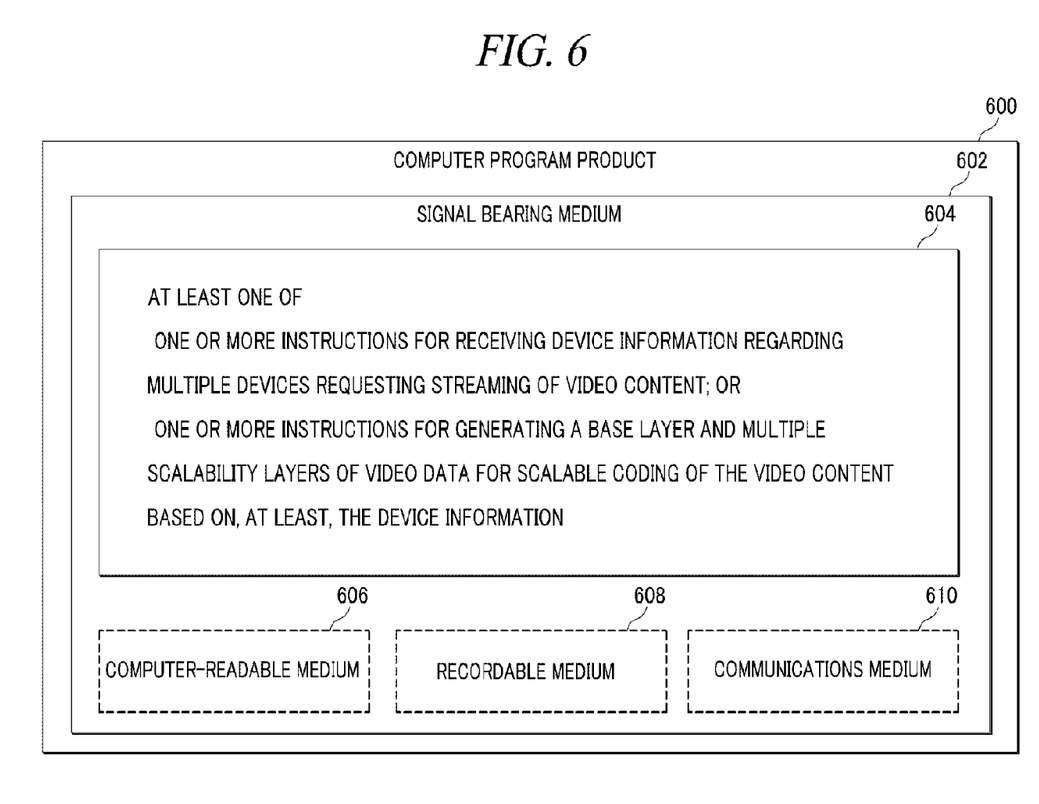
FIG. 6 illustrates an example computer program product that may be utilized to implement a scalable video coding scheme, arranged in accordance with at least some embodiments described herein.

FIG. 6 illustrates an example computer program product 600 that may be utilized to implement a scalable video coding scheme, arranged in accordance with at least some embodiments described herein.

Computer program product 600 may be hosted by a server such as server 100, and/or a scalable video encoder such as scalable video encoder 330. As depicted, computer program product 600 may include a signal bearing medium 602. Signal bearing medium 602 may include one or more instructions 604 that, when executed by, for example, a processor, may provide the functionality described above with respect to FIGS. 1-5. By way of example, instructions 604 may include: one or more instructions for receiving device information regarding multiple devices requesting streaming of video content; or one or more instructions for generating a base layer and multiple scalability layers of video data for scalable coding of the video content based on, at least, the device information. Thus, for example, referring to FIGS. 1-5, server 100 and/or scalable video encoder 330 may undertake one or more of the blocks shown in FIG. 5 in response to instructions 604.

In some implementations, signal bearing medium 602 may encompass a computer-readable medium 606, such as, but not limited to, a hard disk drive, a CD, a DVD, a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 600 may be conveyed to one or more modules of server 100 and/or scalable video encoder 330 by an RF signal bearing medium 602, where the signal bearing medium 602 is conveyed by a wireless communications medium 610 (e.g., a wireless communications medium conforming with the IEEE 802.11 standard).

Figure 7:
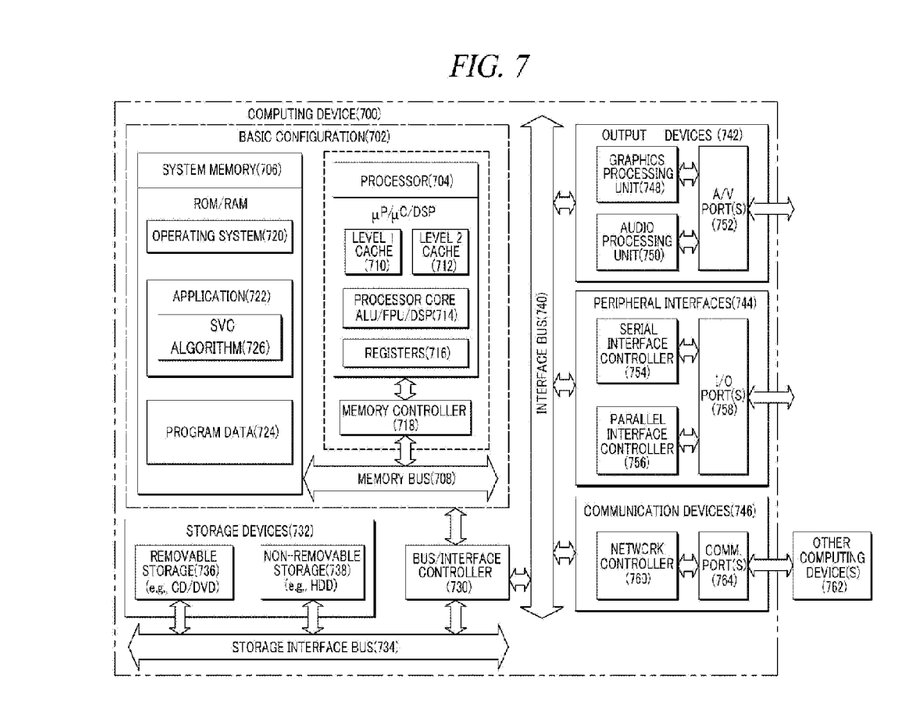
FIG. 7 is a block diagram illustrating an example computing device that may be utilized to implement a scalable video coding scheme, arranged in accordance with at least some embodiments described herein.

FIG. 7 is a block diagram illustrating an example computing device 700 that may be utilized to implement a scalable video coding scheme, arranged in accordance with at least some embodiments described herein.

In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (μP), a microcontroller (μC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), nonvolatile memory (such as ROM, flash memory, etc.) or any combination thereof. System memory 706 may include an operating system 720, one or more applications 722, and program data 724.

Application 722 may include a scalable video coding (SVC) algorithm 726 that may be arranged to perform the functions as described herein including the actions described with respect to the server 100 architecture as shown in FIG. 3 or including the actions described with respect to the flow charts shown in FIG. 5. Program data 724 may include any data that may be useful for providing the scalable video coding scheme as is described herein. In some examples, application 722 may be arranged to operate with program data 724 on an operating system 720 such that the scalable video coding scheme as described herein may be provided.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A non-transitory computer-readable medium storing executable instructions, that, when executed, cause a server to perform operations, comprising:
    receiving, from a plurality of devices that are connected to the server, a request for video content that includes a base layer and a plurality of scalability layers of video data;
    classifying each of the plurality of devices into a respective one of a plurality of device groups based on, at least, capabilities of each of the plurality of devices;
    determining a weight factor for each of the plurality of device groups based on, at least, a sum of subscription fees for a digital video service associated with devices in each of the plurality of device groups;
    prioritizing the plurality of scalability layers by:
        identifying, from among the plurality of scalability layers, next available candidate scalability layers that are of a subsequent upper level layer relative to a current scalability layer,
        determining, for one of the next available candidate scalability layers:
            a number of devices being classified into at least one of the device groups that supports a capability associated with the one of the next available candidate scalability layers,
            the determined weight factor for the at least one of the device groups, and
            a performance enhancement factor that is proportional to:
                an increase of peak signal-to-noise ratio (PSNR),
                the number of devices being classified into at least one of the device groups, and
                the determined weight factor for the at least one of the device groups,
                the performance enhancement factor being inversely proportional to an increase of bandwidth to scale-up from the current scalability layer to a respective one of the next available candidate scalability layers, and
        selecting, from among the next available candidate scalability layers, a next scalability layer based on respective performance enhancement factors; and
    transmitting, to each of the plurality of devices, at least some of the plurality of scalability layers based on, at least, the prioritization.

2. The non-transitory computer-readable medium of claim 1, wherein the receiving comprises receiving, from the each of the plurality of devices, information regarding the capabilities of each of the plurality of devices.

3. The non-transitory computer-readable medium of claim 1, wherein the capabilities of respective ones of the plurality of devices are associated with at least one of spatial resolution, temporal resolution or quality supported by the respective ones of the plurality of devices.

4. The non-transitory computer-readable medium of claim 1, wherein the prioritizing further comprises:
    iterating the identifying of the next available candidate scalability layers, the determining of the number of devices classified into the at least one device group, the determining of the performance enhancement factor, and the selecting of the next scalability layer, until a predetermined spatial resolution, a predetermined temporal resolution and a predetermined quality are reached.

5. The non-transitory computer-readable medium of claim 1, the operations further comprise:
    iterating the receiving, the prioritizing and the transmitting until streaming of the video content ends.

6. A method performed under control of a scalable video encoder for encoding video content, comprising:
    receiving device information regarding a plurality of devices requesting streaming of the video content, wherein the device information comprises capabilities of each of the plurality of devices;
    generating a base layer and a plurality of scalability layers of video data for scalable coding of the video content based on, at least, the device information;
    classifying each of the plurality of devices into a respective one of a plurality of device groups based on, at least, the capabilities of each of the plurality of devices;
    determining a weight factor for each of the plurality of device groups based on, at least, a sum of subscription fees for a digital video service associated with devices in each of the plurality of device groups;

prioritizing the plurality of scalability layers by:
 identifying, from among the plurality of scalability layers, next available candidate scalability layers that are of a subsequent upper level layer relative to a current scalability layer,
 determining, for one of the next available candidate scalability layers:
  a number of devices being classified into at least one of the device groups that supports a capability associated with the one of the next available candidate scalability layers,
  the determined weight factor for the at least one of the device groups, and
  a performance enhancement factor that is proportional to:
   an increase of peak signal-to-noise ratio (PSNR),
   the number of devices being classified into at least one of the device groups, and
   the determined weight factor for the at least one of the device groups,
   the performance enhancement factor being inversely proportional to an increase of bandwidth to scale-up from the current scalability layer to a respective one of the next available candidate scalability layers, and
 selecting, from among the next available candidate scalability layers, a next scalability layer based on respective performance enhancement factors; and
determining the base layer and the plurality of scalability layers based on, at least, the prioritization.

7. The method of claim 6, wherein the capabilities of respective ones of the plurality of devices are associated with at least one of spatial resolution, temporal resolution or quality supported by the respective ones of the plurality of devices.

8. The method of claim 6, wherein the prioritizing further comprises:
iterating the identifying of the next available candidate scalability layers, the determining of the number of devices classified into the at least one device group, the determining of the performance enhancement factor, and the selecting of the next scalability layer, until a predetermined spatial resolution, a predetermined temporal resolution and a predetermined quality are reached.

9. A scalable video encoder comprising:
a device information receiver unit configured to receive device information regarding a plurality of devices requesting video content streaming, wherein the device information comprises capabilities of each of the plurality of devices;
a layer generation unit configured to generate a base layer and a plurality of scalability layers of video data for scalable coding of the video content based on, at least, the device information received by the device information receiver unit;
a device classification unit configured to classify each of the plurality of devices into a respective one of a plurality of device groups based on, at least, the capabilities of each of the plurality of devices; and
a layer prioritization unit configured to:
 determine a weight factor for each of the plurality of device groups based on, at least, a sum of subscription fees for a digital video service associated with devices in each of the plurality of device groups, and
 prioritize the plurality of scalability layers based by:
  identifying, from among the plurality of scalability layers, next available candidate scalability layers that are of a subsequent upper level layer relative to a current scalability layer,
  determining, for one of the next available candidate scalability layers:
   a number of devices being classified into at least one of the device groups that supports a capability associated with the one of the next available candidate scalability layers,
   the determined weight factor for the at least one of the device groups, and
   a performance enhancement factor that is proportional to:
    an increase of peak signal-to-noise ratio (PSNR),
    the number of devices being classified into at least one of the device groups, and
    the determined weight factor for the at least one of the device groups,
    the performance enhancement factor being inversely proportional to an increase of bandwidth to scale-up from the current scalability layer to a respective one of the next available candidate scalability layers, and
  selecting, from among the next available candidate scalability layers, a next scalability layer based on respective performance enhancement factors,
wherein the layer generation unit is further configured to generate the base layer and the plurality of scalability layers, based on, at least, the prioritization by the layer prioritization unit.

10. The scalable video encoder of claim 9, wherein the capabilities of respective ones of the plurality of devices are associated with at least one of spatial resolution, temporal resolution or quality supported by the respective ones of the plurality of devices.

11. The scalable video encoder of claim 9, wherein the layer prioritization unit is further configured to iterate the identifying of the plurality of next available candidate scalability layers, the determining of the number of devices classified into the at least one device group, the determining of the performance enhancement factor, and the selecting of the next scalability layer, until a predetermined spatial resolution, a predetermined temporal resolution and a predetermined quality are reached.

* * * * *

UNITED STATES PATENT AND TRADEMARK OFFICE
CERTIFICATE OF CORRECTION

| | | |
|---|---|---|
| PATENT NO. | : 9,510,006 B2 | Page 1 of 1 |
| APPLICATION NO. | : 14/124389 | |
| DATED | : November 29, 2016 | |
| INVENTOR(S) | : Lee | |

It is certified that error appears in the above-identified patent and that said Letters Patent is hereby corrected as shown below:

On the Title Page

In item (71), under "Applicant", in Column 1, Line 2, delete "Wilmington (DE)" and insert -- Wilmington, DE (US) --, therefor.

In the Specification

In Column 1, Line 5, delete "APPLICATIONS" and insert -- APPLICATION --, therefor.

In Column 1, Line 8, delete "§371" and insert -- § 371 --, therefor.

In the Claims

In Column 18, Line 10, in Claim 9, delete "layers based by:" and insert -- layers by: --, therefor.

In Column 18, Line 49, in Claim 11, delete "identifying of the plurality of next" and insert -- identifying of the next --, therefor.

Signed and Sealed this
Twenty-eighth Day of March, 2017

Michelle K. Lee
*Director of the United States Patent and Trademark Office*